United States Patent [19]

Asahara et al.

[11] Patent Number: 4,800,724

[45] Date of Patent: Jan. 31, 1989

[54] BRAKE BOOSTER DEVICE PROVIDING PRESSURE TO BOTH PRESSURE CHAMBERS OF TANDEM BRAKE MASTER CYLINDER DEVICE

[75] Inventors: Makoto Asahara; Kenji Shirai, both of Toyota, Japan

[73] Assignee: Toyota Jidosha Kabushiki Kaisha, Toyota, Japan

[21] Appl. No.: 946,866

[22] Filed: Dec. 29, 1986

[30] Foreign Application Priority Data

Dec. 27, 1985 [JP] Japan .............................. 60-296658

[51] Int. Cl.$^4$ .............................................. F15B 7/00
[52] U.S. Cl. ........................................... 60/560; 60/563
[58] Field of Search .................. 60/560, 563, 566, 586, 60/587

[56] References Cited

U.S. PATENT DOCUMENTS

| 4,417,768 | 11/1983 | Satoh | 60/586 |
| 4,592,599 | 6/1986 | Belart | 60/560 |
| 4,641,894 | 2/1987 | Belart | 60/560 |
| 4,682,824 | 7/1987 | Burgdorf | 60/563 |

Primary Examiner—Edward K. Look

Attorney, Agent, or Firm—Oblon, Fisher, Spivak, McClelland & Maier

[57] ABSTRACT

This brake booster is for a vehicle whose tandem type brake master cylinder has a first piston and a second piston operating in tandem, with first and second pressure chamber and a reservoir chamber for the second brake fluid supply pressure chamber being defined in it. The brake booster has a power piston, one side of which is presented to an actuating pressure chamber, and which is driven by supply of pressurized brake fluid to that actuating pressure chamber so as to push the first piston of the master cylinder so as to expel fluid from the first and second pressure chambers towards the vehicle brakes. Brake fluid is supplied by a valve to the booster actuating pressure chamber upon brake pedal depression. A conduit is provided for directly conducting fluid from the actuating pressure chamber of the brake booster to the reservoir chamber for the second pressure chamber of the master cylinder. Optionally, intermediate along this conduit, a valve may be provided for interrupting fluid flow when the level of brake fluid stored in a booster storage reservoir drops below a determinate level, or when also the pressure of fluid in an accumulator for the booster actuating pressure chamber drops below a determinate level.

4 Claims, 1 Drawing Sheet

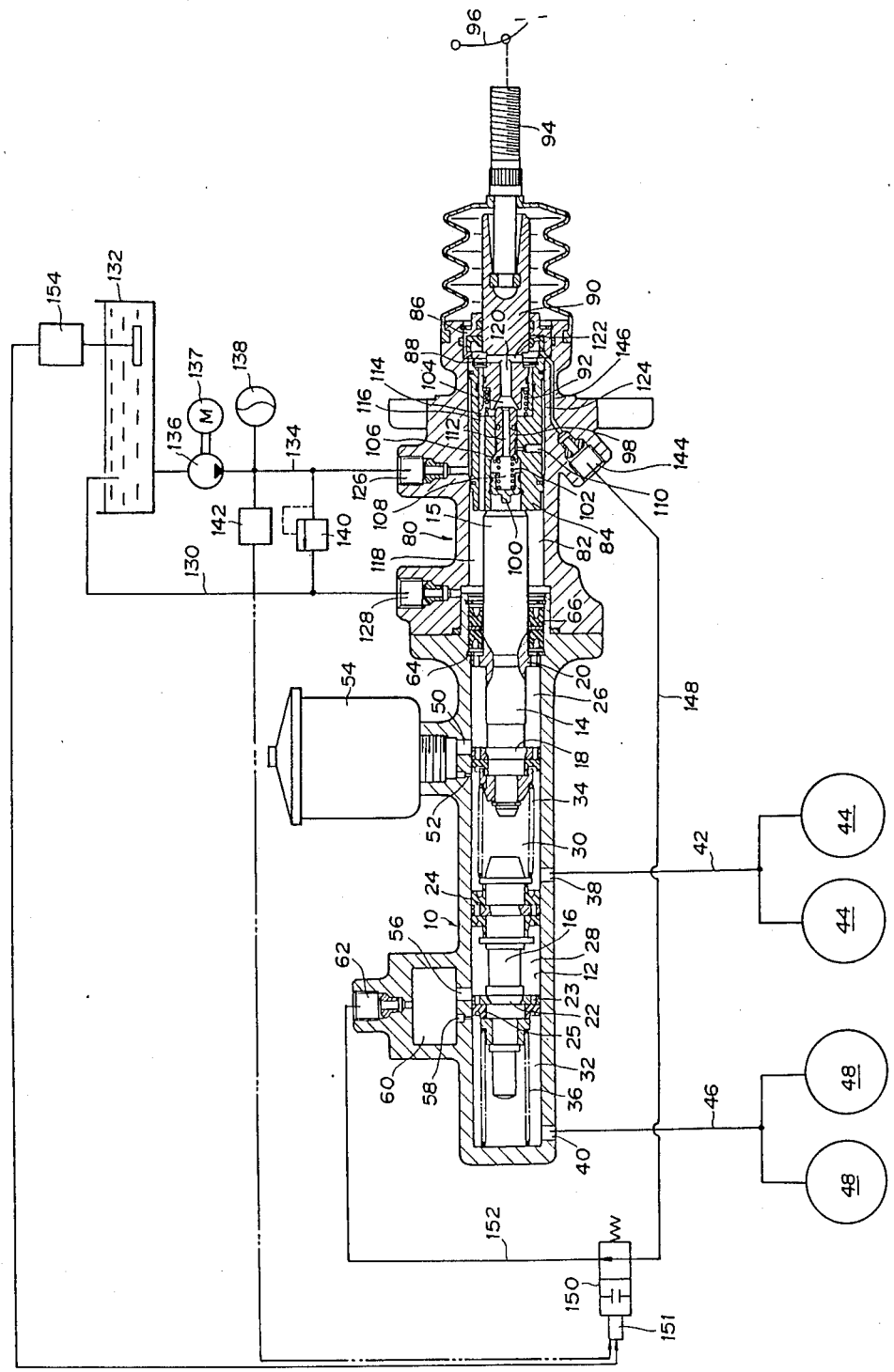

BRAKE BOOSTER DEVICE PROVIDING PRESSURE TO BOTH PRESSURE CHAMBERS OF TANDEM BRAKE MASTER CYLINDER DEVICE

BACKGROUND OF THE INVENTION

The present invention relates to a brake booster device, and more particularly relates to such a brake booster device for a vehicle such as an automobile, particularly adapted to provide good braking action, especially during the initial stage of braking operation.

The present invention has been described in Japanese Patent Application Ser. No. Showa 60-296658 (1985), filed by an applicant the same as the applicant or the entity assigned or owed duty of assignment of the present patent application; and the present patent application hereby incorporates into itself by reference the text of said Japanese Patent Application and the claims and the drawings thereof; a copy is appended to the present application.

In the prior art, there have been proposed various types of brake booster device for supplementing the piston pressure of a brake master cylinder device, in order to reduce the actuating pressure that is required for the driver of the vehicle to exert on the brake pedal thereof. In Japanese Patent Laying Open Publication Ser. No. 56-13250 (1981), for example, which it is not intended hereby to admit as prior art to the present patent application except to the extent in any case required by applicable law, there is disclosed such a brake booster device.

With such a brake booster device, when it is a hydraulic type of brake booster device as opposed to a vacuum type brake booster device, typically there is provided a control valve which is operated by depression of the brake pedal of the vehicle, and which when thus operated supplies pressurized hydraulic fluid to the actuating cylinder of a power piston. Thus, when operated, this power piston pushes the piston of the brake master cylinder device, or the primary piston of the brake master cylinder device in the case that said brake master cylinder device is of a tandem type, in the direction for squirting out brake fluid into the braking system of the vehicle.

There is however a problem with such a brake booster device, when as specified above the brake master cylinder device to which it is fitted is of a tandem type, in that only the primary piston of such a tandem type brake master cylinder device can be directly pushed by the brake booster device. Accordingly, since in a hydraulic type brake booster device the sliding resistance is inevitably substantially greater than in a vacuum type brake booster device, particularly in the initial stage of brake operation in which the brakes of the vehicle are first being applied, the supplementary force provided by the brake booster device for actuating the tandem type brake master cylinder device is relatively small. The consequence of this is that it is difficult for such a hydraulic type brake booster device, when fitted to such a tandem type brake master cylinder device, to provide as good a braking feeling as would a vacuum type brake booster device.

SUMMARY OF THE INVENTION

Accordingly, it is the primary object of the present invention to provide a brake booster device, which avoids the problems detailed above.

It is a further object of the present invention to provide such a brake booster device which is particularly of the hydraulic type.

It is a further object of the present invention to provide such a brake booster device, which provides a good braking operational feeling.

It is a further object of the present invention to provide such a brake booster device, which particularly provides a good braking operational feeling during the initial stage of braking application.

It is a further object of the present invention to provide such a brake booster device, which does not require any unduly high braking force to be applied by the driver of a vehicle to which said brake booster device is fitted.

It is a further object of the present invention to provide such a brake booster device, which does not require any unduly long braking distance to be traveled by the brake pedal of a vehicle to which said brake booster device is fitted.

It is a yet further object of the present invention to provide such a brake booster device, which has good characteristics with regard to fall back safety.

It is a yet further object of the present invention to provide such a brake booster device, which ensures that even in the case of brake fluid level falling to be relatively low the braking integrity of the vehicle is assured.

It is a yet further object of the present invention to provide such a brake booster device, which ensures that even in the case of brake fluid pressure falling to a relatively low level the braking integrity of the vehicle is assured.

According to the most general aspect of the present invention, these and other objects are attained by, for a tandem brake master cylinder device, for a vehicle comprising a means for brake system actuation, having a first piston and a second piston operation in tandem, with first and second brake fluid supply pressure chambers being defined in said tandem brake master cylinder device, and a reservoir chamber being further defined in said tandem brake master cylinder device for supplying fluid to said second brake fluid supply pressure chamber: a brake booster device, comprising: a power piston, one side of which is presented to an actuating pressure chamber defined in said brake booster device, and driven by supply of pressurized fluid to said actuating pressure chamber in a direction so as to push said first piston of said tandem brake master cylinder device in a direction to expel fluid from said first and said second brake fluid supply pressure chambers; a means for supplying fluid to said actuating pressure chamber upon actuation of said brake system actuation means of said vehicle; and: a means for conducting fluid from said actuating pressure chamber of said brake booster device to said reservoir chamber of said tandem brake master cylinder device.

According to such a brake booster device as specified above, since when the brake pedal of the vehicle is depressed pressurized brake fluid is supplied to said actuating pressure chamber and thence is conducted to said reservoir chamber of said tandem brake master cylinder device, whence said pressurized brake fluid is supplied directly to said second brake fluid supply pressure chamber, not only is the pressure in the first brake fluid supply pressure chamber of the master cylinder chamber directly raised by the pressure of the first piston, but also the pressure in the second brake fluid supply pressure chamber of the master cylinder device is directly raised by this supply of fluid directly thereto. Thereby, this brake booster device provides a good braking operational feeling, particularly during the initial stage of braking application. Further, this brake booster device does not require any unduly high braking force to be applied by the driver of a vehicle to which said brake booster device is fitted; nor does it require any unduly long braking distance to be traveled by the brake pedal of said vehicle.

According to a particular specialization of the present invention, the above and other objects may more particularly be accomplished by such a brake booster device as first specified above, further comprising a fluid storage reservoir for fluid to be supplied to said actuating pressure chamber; and yet further comprising, intermediate along said means for conducting fluid from said actuating pressure chamber of said brake booster device to said reservoir chamber of said tandem brake master cylinder device, a means for interrupting fluid conduction through said fluid conducting means, when the level of fluid stored in said fluid storage reservoir drops below a determinate level. In this case, there will be a fail safe mechanism provided, whereby if either of the front or the rear braking systems for the vehicle develops a leak, the other such braking system is not affected. And, according to an alternative particular specialization of the present invention, the above and other objects may more particularly be accomplished by such a brake booster device as first specified above, further comprising a fluid storage reservoir for fluid to be supplied to said actuating pressure chamber and an accumulator for storing pressurized fluid from said fluid storage reservoir for supply to said actuating pressure chamber; and yet further comprising, intermediate along said means for conducting fluid from said actuating pressure chamber of said brake booster device to said reservoir chamber of said tandem brake master cylinder device, a means for interrupting fluid conduction through said fluid conducting means, either when the level of fluid stored in said fluid storage reservoir drops below a determinate level, or the pressure level of fluid in said accumulator drops below a determinate pressure level, or both. In this case, the fail safe operation is even more positively assured.

BRIEF DESCRIPTION OF THE DRAWINGS

The present invention will now be described with respect to the preferred embodiment of the device and of the method thereof, and with reference to the illustrative drawing appended hereto, which however are provided for the purposes of explanation and exemplification only, and are not intended to be limitative of the scope of the present invention in any way, since this scope is to be delimited solely by the accompanying claims. With relation to the sole FIGURE of the appended drawing, spatial terms are to be understood as referring only to the orientation on the drawing paper of the illustrations of the relevant parts, unless otherwise specified, and said drawing FIGURE is a schematic longitudinal skeleton view of the preferred embodiment of the brake booster device of the present invention, along with a tandem type master cylinder device with which said preferred embodiment of the brake booster device is associated, for use with a dual type braking system of a vehicle.

DESCRIPTION OF THE PREFERRED EMBODIMENT

The present invention will now be described with reference to the preferred embodiment thereof, and with reference to the sole drawing figure. The preferred embodiment of the brake booster device of the present invention is shown in longitudinal sectional view in the drawing figure along with a tandem type brake master cylinder device for use with a dual type braking system of a vehicle. In this figure, the reference numeral 10 designates the body of the master cylinder device, and 80 designates the body of the brake booster device: these two bodies 10 and 80 are joined together coaxially.

CONSTRUCTION OF THE MASTER CYLINDER DEVICE

The master cylinder body 10 is formed with a cylinder bore 12, having a closed end and an open end, and in this master cylinder body 10 there are provided a first piston member 14 and a second piston member 16 both slidably mounted in said cylinder bore 12 so as to be movable to and fro along the axial direction thereof. The first piston member 14 is the one fitted less deeply in said cylinder bore 12 and on the right side thereof in the figure towards its open end, while the second piston member 16 is the one fitted more deeply in said cylinder bore 12 and on the left side thereof in the figure towards its closed end.

The first piston member 14 is formed with two lands 18 and 20 on which it slides in said cylinder bore 12. Between the inner end of the first piston member 14 and the outer end of the second piston member 16 there is fitted a compression coil spring 34 which thus biases apart said first piston member 14 and said second piston member 16, i.e. which biases said first piston member 14 rightwards in the cylinder bore 12 from the point of view of the figure, outwards from the cylinder bore 12, while simultaneously biasing said second piston member 16 leftwards in said cylinder bore 12 from the point of view of the figure, inwards into said cylinder bore 12. And the second piston member 16 is formed with two lands 22 and 24 on which it slides in said cylinder bore 12, and between this second piston member 16 and the closed inner end of the cylinder bore 12 there is fitted another compression coil spring 36 which thus biases said second piston member 16 leftwards in the cylinder bore 12 from the point of view of the figure, outwards from the cylinder bore 12. And the left end in the figure of the first piston member 14 is pushed, via the preferred embodiment of the brake booster device of the present invention as will be explained in detail later, by a push rod 94 the other end of which is connected to a brake pedal of a vehicle for being depressed by the foot of a driver of said vehicle, although these arrangements are not particularly shown. Thus, when said accelerator pedal is depressed by the foot of the driver, and thereby said push rod 94, via the preferred embodiment of the brake booster device of the present invention, forces the first piston member 14 leftwards in the figure in the cylinder bore 12, the second piston member 16 becomes thereby positioned at an intermediate point in the cylinder bore 12 according to a balance which is struck between the opposing spring forces of the compression coil springs 34 and 36 and the pressures in various chambers defined in said cylinder bore 12 which will be explained shortly. A stopper ring 64 provided at the open end of the cylinder bore 12 prevents the first piston member 14 from ever coming out of said open end.

Referring to the orientation of the parts shown in the figure, in the cylinder bore 12 between the left land 18 of the first piston member 14 and the right land 24 of the second piston member 16 there is defined a first pressure chamber 30, and in said cylinder bore 12 between the left land 22 of the second piston member 16 and the closed end of the cylinder bore 12 there is defined a second pressure chamber 32. And in said cylinder bore 12 between the right land 20 and the left land 18 of said first piston member 14 there is defined a first reservoir connection chamber 26, and in said cylinder bore 12 between the right land 24 and the left land 22 of the second piston member 16 there is defined a second reservoir connection chamber 28.

A fluid reservoir port 50 is formed in the side of said cylinder bore 12 in such a position that, whatever be the axial position of the first piston member 14 in the cylinder bore 12, the first reservoir connection chamber 26 is communicated to said fluid reservoir port 50 and therethrough with a brake fluid reservoir 54. At a position in said cylinder bore 12 somewhat to the left in the figure of said fluid reservoir port 50 there is also formed a somewhat restricted orifice port 52, which communicates the first pressure chamber 30 to said brake fluid reservoir 54, when and only when the first piston member 14 is in its extreme position to the right from the point of view of the figure in the cylinder bore 12, which is its initial position, as shown in the figure; but, when said first piston member 14 is displaced from its said extreme initial position to the right in the cylinder bore 12 to any substantial extent to the left, then communication of said first pressure chamber 30 to said brake fluid reservoir 54 is interrupted by the intervention of the land 18 of said first piston member 14. Further in the body 10 of this master cylinder device there is formed a front wheels brake fluid outlet port 38, opening to the first pressure chamber 30, which is connected to a brake line 42 for receiving brake fluid compressed therein and for transmitting said compressed brake fluid to the brake cylinders 44 for the front wheels of the vehicle to which this master cylinder device is fitted.

Similarly, another fluid reservoir port 56 is formed in the side of said cylinder bore 12 in such a position that, whatever be the axial position of the second piston member 16 in the cylinder bore 12, the second reservoir connection chamber 28 is communicated to said fluid reservoir port 56 and therethrough with a brake fluid reservoir chamber 60. At a position in said cylinder bore 12 somewhat to the left in the figure of said fluid reservoir port 56 there is also formed a somewhat restricted orifice port 58, which communicates the second pressure chamber 36 to said brake fluid reservoir chamber 60, when and only when the second piston member 16 is in its extreme position to the right from the point of view of the figure in the cylinder bore 12, which is its initial position, as shown in the figure; but, when said second piston member 16 is displaced from its said extreme initial position to the right in the cylinder bore 12 to any substantial extent to the left, then communication of said second pressure chamber 32 to said brake fluid reservoir chamber 60 is interrupted by the intervention of the land 22 of said second piston member 16. Further in the body 10 of this master cylinder device there is formed a rear wheels brake fluid outlet port 40, opening to the second pressure chamber 32, which is connected to a brake line 46 for receiving brake fluid compressed therein and for transmitting said compressed brake fluid to the brake cylinders 48 for the rear wheels of the vehicle to which this master cylinder device is fitted.

The right land 22 in the figure of the second piston member 16 is pierced with a through hole 23 (actually this through hole 23 is of course provided in plurality) and is fitted with an annular seal element 25 made of an elastomer such as rubber, which seals between the second reservoir connection chamber 28 and the second pressure chamber 32; and thereby fluid flow is allowed from said second reservoir connection chamber 28 to said second pressure chamber 32, but not in the reverse direction from said second pressure chamber 32 to said second reservoir connection chamber 28. And the right land 24 of said second piston member 16 is fitted with another annular seal element also made of an elastomer such as rubber, which seals between the second reservoir connection chamber 28 and the first pressure chamber 30. Through the left land 18 of the first piston member 14 there are formed another plurality of small orifices, which allow brake fluid to flow from the first reservoir connection chamber 26 past a seal element also made of an elastomer such as rubber which is mounted to said land 18 and similarly provides a non return action, into the first pressure chamber 30 but not in the reverse direction. And the right land 20 in the figure of the first piston member 14 is fitted on its right side with another two annular seal elements also made of an elastomer such as rubber and together providing an effective two way seal between the first reservoir connection chamber 26 and a chamber 118 defined on the right side of this land 20 as will be explained shortly.

CONSTRUCTION OF THE BRAKE BOOSTER DEVICE

The brake booster body 80 is connected against the open right hand end in the figure of the master cylinder body 10, and is formed with a cylinder bore 82 which is substantially coaxial with and is of substantially the same diameter as the cylinder bore 12 which is formed in said master cylinder body 10. And a sleeve shaped piston member 84 is mounted in said cylinder bore 82 so as to be axially slidable to and fro therein upon a pair of lands formed on the said sleeve shaped piston member 84. Between these lands, around said sleeve shaped piston member 84 between it and the cylinder bore 82, there is defined a surrounding annular chamber 124. The left end in the figure of said sleeve shaped piston member 84 abuts against the right end 15 in the figure of the first piston member 14, so as to drive it as will be explained hereinafter, and a reservoir chamber 118 is defined around said right end 15 in the figure of said first piston member 14, between its land 20 and said sleeve shaped piston member 84. And at the right end in the figure of said sleeve shaped piston member 84 there is defined within the cylinder bore 82 a booster actuation chamber 88. An end cap 86 is fitted into the right end of the cylinder bore 82 of the brake booster body 80 and closes it, thus delimiting said booster actuation chamber (booster actuation means) 88. A plunger 90 is fitted through said end cap 86 so as to be slidable therein, and the left end in the figure of said plunger 90 approaches the right end in the figure of the sleeve shaped piston member 84 and is engaged therewith; the sleeve shaped piston member 84 and the plunger 90 can only move in the axial direction with respect to one another through a relatively short distance, and said sleeve shaped piston member 84 and said plunger 90 are urged apart by a compression coil spring 92 which is fitted between them. The right end in the figure of the plunger 90 which projects outside the end cap 86 is drivingly engaged with the left end in the figure of the previously mentioned push rod 94, which as explained above is driven by a brake pedal and linkage therefor 96, only schematically shown, so as to be pushed to the left in the figure as and when said brake pedal is depressed, for providing braking action, by being pushed downwards by the foot of the driver of the vehicle to which this brake booster device and master cylinder device are fitted.

The sleeve shaped piston member 84 is formed with an axially extending hole, in which there is slidably fitted a tubular valve element 98, and these elements constitute a booster control valve. In detail, the tubular valve element 98 is urged to the right as seen in the figure with respect to the sleeve shaped piston member 84 by a compression coil spring 102 fitted between said valve element 98 and a spring retainer cap 100 fixed to the sleeve shaped piston member 84; an end flange on said valve element 98 prevents it from moving further to the right as seen in the figure with respect to the sleeve shaped piston member 84 than the mutual relative position of these elements shown in the figure, in which mutual relative position said flange engages against a valve seat 104 formed at the end of the axially extending hole in which this valve element 98 slides, thus cutting off communication between a chamber 108 defined around the compression coil spring 102 and a port 110 formed through the side of the sleeve shaped piston member 84 which opens into the side of the axial hole therethrough at a space defined by a constricted portion of the valve element 98. And, in this mutual relative position of these elements shown in the figure, the chamber 108 is communicated via an axial hole 112 formed through it and via a conical valve seat 104 formed in the plunger 90 with a chamber 114 defined between the sleeve shaped piston member 84 and the plunger 90. On the other hand, when the vehicle driver steps on the brake pedal 96, the plunger 90 is driven at least somewhat to the left as seen in the figure, and substantially immediately the conical valve seat 104 formed on the left end of said plunger 90 in the figure is pressed against the right end in the figure of the valve element 98, thus interrupting communication between the chamber 108 and the chamber 114 while also displacing the flange at the left end in the figure of said valve element 98 away from the valve seat 106 and establishing communication thereby between the chamber 108 and the port 110 and also via the axial hole 112 and passages 120 and 122 formed in the plunger 90 with the booster actuation chamber 88. The port 110 is connected via the annular chamber 124 to a connection port 126 provided in the brake booster body 80, while the reservoir chamber 118 is connected to another connection port 128 also provided in the brake booster body 80.

The connection port 128 is communicated via a brake fluid return conduit 130 to a brake fluid reservoir 132. The connection port 126 is communicated via a brake fluid supply line 134 to an electric brake fluid supply pump 136. Intermediate along said brake fluid supply line 134 there are provided an accumulator 138, a relief valve 140, and an accumulator pressure switch 142. The accumulator pressure switch 142 is constructed so as to become switched ON when the pressure in the accumulator 138 is less than a determinate pressure value, so as to start a motor 137 of the electric brake fluid supply pump 136 operating so as to cause said electric brake fluid supply pump 136 to pressurize brake fluid by pumping it from the brake fluid reservoir 132 into the brake fluid supply line 134.

The brake booster body 80 is formed with a conduit 146, one end of which communicates to the booster acutation chamber 88 while its other end communicates to a connection port 144 provided at the exterior of said brake booster body 80. A conduit 148 is connected to this connection port 144 and communicates it to one side of an electrically operated ON/OFF switching valve 150 incorporating a solenoid 151. From the other side of said electrically operated ON/OFF switching valve 150 a conduit 152 leads to a port 62 which opens to the brake fluid reservoir chamber 60, previously mentioned. This electrically operated ON/OFF switching valve 150 is controlled by supply of electrical energy from a brake fluid level warning switch 154 provided to the brake fluid reservoir 132 and also from the accumulator pressure switch 142, according to a logic circuit not particularly shown but which may be of a per se known AND or OR gate type, and: when said electrically operated ON/OFF switching valve 150 is thus supplied with actuating electrical energy it connects together the conduit 148 and the conduit 152, while on the other hand when said electrically operated ON/OFF switching valve 150 is not thus supplied with actuating electrical energy it disconnects the conduit 148 and the conduit 152 from one another. In summary, the function of this system (the constructional details of an implementation of which may be supplemented by one of ordinary skill in the relevant art without undue experimentation, based upon the revelations in the present disclosure) is that: said electrically operated ON/OFF switching valve 150 is closed so as to disconnect the conduit 148 and the conduit 152 from one another, when either (a) the level of the brake fluid in the brake fluid reservoir 132 is lower than a determinate level therefor, or (b) the pressure in said accumulator 138 is lower than a determinate pressure value therefor.

OPERATION

This preferred embodiment of the brake booster device of the present invention operates as will now be described.

When the brake pedal of the vehicle to which this master cylinder device is fitted is in the released condition and the device is in the substantially static state, then the push rod 94 does not press substantially upon the plunger 90 which in its turn does not push substantially on the sleeve shaped piston member 84 which in its turn does not push substantially on the first piston member 14, and said first piston member 14 and the second piston member 16 are positioned by the biasing action of the compression coil springs 34 and 36 to their maximum positions to the right in the figure in the cylinder bore 12, as shown in the figure. In this operational condition, the first pressure chamber 30 is communicated via the orifice port 52 to the brake fluid reservoir 54. Thus, brake fluid from the brake fluid reservoir 54 is freely supplied to the first pressure chamber 30 in this static state with the vehicle brake pedal being released. Similarly, the second pressure chamber 32 is communicated via the orifice port 58 to the brake fluid reservoir chamber 60, and thus brake fluid from said brake fluid reservoir chamber 60 is freely supplied to the second pressure chamber 32, also in this static state with the vehicle brake pedal being released. And at this time and throughout vehicle operation, by the operation of the electric brake fluid supply pump 136 which is driven by the motor 137 under control of the accumulator pressure switch 142, pressurized brake fluid at a certain determinate pressure set by the venting setting of the relief valve 140 is supplied to the conduit 134 and is stored in the accumulator 138, thus being present in the annular chamber 124. However, because the valve seat 106 is closed at this time by the valve element 98 which is not being pushed by the plunger 90, this pressurized brake fluid is not supplied via the port 110 to any other point in the system at this time.

When from this state the brake pedal is initially pressed downwards, this causes the push rod 94 to push on the end of the plunger 90 and impel it leftwards in the figure, which then compresses the compression coil spring 92 and moves the sleeve shaped piston member 84 also leftwards in the figure, thus pushing leftwards in the figure on the first piston member 14 and moving it leftwards against the biasing force of the compression coil spring 34 which is overcome, and under the balance struck between the opposing biasing forces of the compression coil springs 34 and 36 the second piston member 16 likewise moves to the left as seen in the figure from its position in the figure. According to this movement, as soon as the land 18 of the first piston member 14 passes past the orifice port 52 opening in the side of the cylinder bore 12, communication between the first pressure chamber 30 and the brake fluid reservoir 54 is interrupted, and along with further movement of the first piston member 14 the pressure in the first pressure chamber 30 rises thereafter. This first pressure chamber 30 pressure is supplied via the conduit 42 to the brake cylinders 44 for the front wheels of the vehicle, thus applying the front vehicle brakes. Also, simultaneously with this, as the second piston member 16 is thus moved to the left as seen in the figure, as soon as the land 22 of said second piston member 16 passes past the orifice port 58 opening in the side of the cylinder bore 12, communication between the second pressure chamber 32 and the brake fluid reservoir chamber 60 is interrupted. And thereafter along with further movement of the second piston member 16 the pressure in the second pressure chamber 32 rises. This second pressure chamber 32 pressure is supplied via the conduit 46 to the brake cylinders 48 for the rear wheels of the vehicle, thus applying the rear vehicle brakes.

Further, substantially immediately with the pressing of the brake pedal, the plunger 90 presses the valve element 98 to the left with respect to the sleeve shaped piston member 84, thus opening the valve seat 106 and communicating the chamber 108 with the port 110, while at the same time intercepting communication through the conical valve seat 104 of said plunger 90. Thereby, the connection port 126 to which pressurized brake fluid is being supplied is communicated, via the annular chamber 124, the port 110, the chamber 108, the axial hole 112, and the passage structure 120 formed in the plunger 90 to the booster actuation chamber 88, and thereby pressurized brake fluid is supplied to said booster actuation chamber 88.

This pressurized brake fluid supplied to the booster actuation chamber 88 acts upon the right end in the figure of the sleeve shaped piston member 84, thus pushing said sleeve shaped pistom member 84 to the left in the figure. As a result, the first piston member 14 is pushed to the left in the figure, i.e. in the direction to pressurize further the first pressure chamber 30 so as to further apply the front braking system of the vehicle as explained above. Thereby a booster effect is provided for the front braking system of the vehicle, by this supplementary pressure being put upon the first piston member 14.

Further, particularly according to the concept of the present invention, the pressurized brake fluid supplied to the booster actuation chamber 88 is also supplied via the conduit 146, the connection port 144, the conduit 148, and via the electrically operated ON/OFF switching valve 150 (if as is typical said electrically operated ON/OFF switching vaive 150 is in the open condition) and the conduit 152 to the port 62 and into the brake fluid reservoir chamber 60 which is communicated to the second reservoir connection chamber 28 via the orifice 56. From this second reservoir connection chamber 28 this booster pressure can flow through the orifices 23 past the seal element 25 into the second pressure chamber 32, to be supplied directly via the conduit 46 to the cylinders 48 for the rear brakes of the vehicle, thus quickly and positively applying the vehicle rear braking system. Further, especially in the initial portion of braking system operation when the second piston member 16 has not yet moved far enough for its land 22 to intercept the port 58 from communication with the second pressure chamber 32, said pressurized brake fluid is supplied directly to said second pressure chamber 32 and thence to the rear braking system of the vehicle. Thereby a particularly quick and effective booster effect is provided for the rear braking system of the vehicle, by this supplementary pressure being supplied substantially directly thereto, particularly when the vehicle brakes are being initially applied; and the brake pedal force required to be applied by the driver of the vehicle for providing a given braking effect is reduced, especially during initial braking operation, and the stroke required from the brake pedal 96 is shortened.

Thereafter, as the driver presses further on the brake pedal 96, the first piston member 14 and the second piston member 16 are further driven to the left as seen in the figure by the pressure of the plunger 90 and the sleeve shaped piston member 84 as is per se conventional, expelling brake fluid from the first pressure chamber 30 and the second pressure chamber 32 to the two braking systems of the vehicle and applying the brakes thereof more and more. And the booster action as described above continues to be available.

On the other hand, when the vehicle driver releases the brake pedal 96, then by the biasing action of the compression coil springs 34 and 36 the first piston member 14 and the second piston member 16 are moved back towards their initial positions as shown in the figure, and further when said brake pedal 96 has been completely released the biasing action of the compression coil spring 92 moves the plunger 90 rightwards in the figure with respect to the sleeve shaped piston member 84, thus allowing the valve element 98 to be moved rightwards in the figure with respect to the sleeve shaped piston member 84 by the biasing action of the compression coil spring 102, thereby causing the conical valve seat 104 to be opened while intercepting communication through the valve seat 106. Thereby, the connection port 126 is now discommunicated from the chamber 108, and the booster actuation chamber 88 is communicated via the conduits 122 and 120, via the chamber 114, and via the chamber 116 to the reservoir chamber 118; and thereby the pressure in said booster actuation chamber 88 is released and vented, and the brake fluid which had passed into the second pressure chamber 32 from said booster actuation chamber 88 when the brake pedal 96 was pressed as described above flows back via the orifice 58, the brake fluid reservoir chamber 60, the port 62, the conduit 152, the electrically operated ON/OFF switching valve 150 which is normally open, the conduit 148, the connection port 144, and the conduit 146 back to said booster actuation chamber 88 again, and thence furter to the reservoir chamber 118 and thence via the connection port 128 through the brake fluid return conduit 130 to the brake fluid reservoir 132.

According to a particular merit of the shown construction, if either the front or the rear braking system for the vehicle should develop a leak, this may perhaps cause the brake fluid level in the brake fluid reservoir 132 to drop below the determinate level therefor, and this as explained above will cause the brake fluid level warning switch 154 to operate, thus causing the electrically operated ON/OFF switching valve 150 to close and interrupting communication between the brake fluid conduits 148 and 152. When this happens, there is no longer available the auxiliary booster action for the rear braking system of the vehicle, but the leakage in one of the vehicle braking systems is not allowed to substantially affect the other of said vehicle braking systems.

Similarly, according to another particular merit of the shown construction, if the pressure of brake fluid in the accumulator 138 should drop below the determinate level therefor, then similarly this as explained above will cause the brake fluid level warning switch 154 to operate, thus causing the electrically operated ON/OFF switching valve 150 to close and interrupting communication between the brake fluid conduits 148 and 152. Again, when this happens, there is no longer available the auxiliary booster action for the rear braking system of the vehicle, but the leakage in one of the vehicle braking systems is not allowed to substantially affect the other of said vehicle braking systems. In other words, in a typical operational episode, even before the brake fluid level in the brake fluid reservoir 132 is caused by the pumping action of the pump 136 actually to drop to below the determinate level therefor so as to cause the brake fluid level warning switch 154 to operate when said brake fluid level is near to or substantially at the bottom of said brake fluid reservoir 132, the auxiliary booster action for the rear braking system of the vehicle is stopped, and thereby the further falling of said brake fluid level in the brake fluid reservoir 132 is averted.

CONCLUSION

Thus, according to the brake booster device specified above, since when the brake pedal of the vehicle is depressed pressurized brake fluid is supplied to the actuating pressure chamber of the booster device and thence is conducted to the reservoir chamber for the second brake fluid supply pressure chamber of the tandem brake master cylinder device, whence said pressurized brake fluid will be supplied directly to said second brake fluid supply pressure chamber; and thus, not only is the pressure in the first brake fluid supply pressure chamber of the master cylinder chamber directly raised by the pressure of the first piston, but also the pressure in the second brake fluid supply pressure chamber of the master cylinder device is directly raised by this supply of fluid directly thereto. Thereby, this brake booster device provides a good braking operational feeling, particularly during the initial stage of braking application. Further, this brake booster device does not require any unduly high braking force to be applied by the dirver of a vehicle to which said brake booster device is fitted; nor does it require any unduly long braking distance to be traveled by the brake pedal of said vehicle. Yet further, by the provision of the electrically operated ON/OFF switching valve 150 in the path between the brake booster device and the abovementioned reservoir chamber, said electrically operated ON/OFF switching valve 150 being controlled as described above according to brake fluid level and also according to brake fluid pressure, the fail safe operation of the system is positively assured.

It is acceptable, according to the principle of the present invention, if it is the rear braking system of the vehicle which is connected to the first pressure chamber 30 and it is the front braking system of the vehicle which is connected to the second pressure chamber 32, rather than the reverse as was the case in the preferred embodiment disclosed above.

Although the present invention has been shown and described in terms of the preferred embodiment thereof, and with reference to the appended drawing, it should not be considered as being particularly limited thereby, since the details of any particular embodiment, or of the drawing, could be varied without, in many cases, departing from the ambit of the present invention. Accordingly, the scope of the present invention is to be considered as being delimited, not by any particular perhaps entirely fortuitous details of the disclosed preferred embodiment, or of the drawing, but solely by the scope of the accompanying claims, which follow.

What is claimed is:

1. A tandem type power brake system for a vehicle, comprising:

a master cylinder body formed with a cylinder bore open at a first axial end thereof and closed at a second axial end thereof opposite to siad first axial end by an end wall, a first piston member fitted in said cylinder bore adjacent said first axial end, a second piston member fitted in said cylinder bore in tandem with said first piston member and positioned adjacent said second axial end, a first pressure chamber defined in said cylinder bore between siad first piston member and said second piston member, a second pressure chamber defined in said cylinder bore between said second piston member and said closed axial end of said cylinder bore, means on said second piston member for defining a fluid reserving space;

means on said second piston member for defining a one way valve for allowing fluid to flow only from said fluid reserving space to said second pressure chamber, a first compression spring disposed in said first pressure chamber between said first piston member and said second piston member for resiliently expanding said first pressure chamber, a second compression spring disposed in said second pressure chamber between said second piston member and said end wall of said master cylinder body for resiliently expanding said second pressure chamber, a first brake fluid outlet port formed in said master cylinder body at a position to open to said first pressure chamber for communication with a first brake system, a second brake fluid outlet port formed in said master cylinder body at a position to open to said second pressure chamber for communication with a second brake system, a fluid reservoir port formed in said master cylinder body at a position to open to said fluid reserving space, mechanical drive means for transmitting a mechanical force to said first piston member in a direction to drive said first piston member toward said second piston member, a valve structure incorporated in said mechanical drive means for opening a first valve passage while closing a second valve passage when said mechanical drive means is being applied with said mechanical force and to close said first valve passage while opening said second valve passage when said mechanical force is not being applied to said mechanical drive means, booster actuation means for supplementing said mechanical force in response to the application of pressurized hydraulic brake fluid pressure thereto, source means for supplying a hydraulic brake fluid under a raised pressure, first conduit means for connecting said fluid reservoir port and said booster actuating means with said raised pressure brake fluid source means via said first valve passage, whereby said fluid reservoir port and said booster actuation means are both supplied with pressurized hydraulic brake fluid via said first valve passage, and second conduit means for draining said fluid reservoir port through said second valve passage.

2. A tandem type power brake system according to claim 1, wherein said master cylinder body is further formed with an orifice port positioned to open to said second pressure chamber only when said second piston member is at a retracted position thereof with said mechanical force not being transmitted to said mechanical driving means, said orifice port being connected in parallel with said fluid reservoir port and with said first and second conduit means.

3. A tandem type power brake system according to claim 1, wherein said raised pressure brake fluid source means includes a reservoir containing a volume of brake fluid therein, said power brake system further comprising means for detecting the amount of the brake fluid contained in said reservoir, and an ON/OFF switching valve adapted to operate in accordance with a signal received from said means for detecting the fluid amount in said reservoir so as to selectively shut off said first and second conduit means when the amount of fluid in said reservoir has decreased below a predetermined amount.

4. A tandem type power brake system according to claim 1, further comprising means for detecting the pressure for the fluid supplied from said raised pressure brake fluid source means, and an ON/OFF switching valve adapted to operate in response to a signal received from said fluid pressure detecting means so as to selectively shut off said first and second conduit means when the pressure of the fluid supplied from said raised pressure brake fluid source means has decreased below a predetermined value.

* * * * *